United States Patent
Lakshminarasimhan et al.

(10) Patent No.: US 12,289,490 B2
(45) Date of Patent: Apr. 29, 2025

(54) APPLICATION CACHE ACCELERATION USING DEVICE CONTENT CACHE

(71) Applicant: Lilac Cloud, Inc., Saratoga, CA (US)

(72) Inventors: Srikanth Lakshminarasimhan, Bangalore (IN); Jay Shah, Morgan Hill, CA (US); Umesh Kumar Muniswamy, Tirupati (IN); Simon Luigi Sabato, Saratoga, CA (US); Jui-Yang Lu, Fremont, CA (US); Harish Ramamurthy Devanagondi, Saratoga, CA (US)

(73) Assignee: LILAC CLOUD, INC., Seattle, WA (US)

( * ) Notice: Subject to any disclaimer, the term of this patent is extended or adjusted under 35 U.S.C. 154(b) by 0 days.

(21) Appl. No.: 18/056,363

(22) Filed: Nov. 17, 2022

(65) Prior Publication Data
US 2024/0171810 A1   May 23, 2024

(51) Int. Cl.
*H04N 21/433* (2011.01)
*H04N 21/231* (2011.01)

(52) U.S. Cl.
CPC ... *H04N 21/4331* (2013.01); *H04N 21/23106* (2013.01); *H04N 21/4332* (2013.01)

(58) Field of Classification Search
CPC ......... H04N 21/4331; H04N 21/23106; H04N 21/4332
See application file for complete search history.

(56) References Cited

U.S. PATENT DOCUMENTS

| | | | |
|---|---|---|---|
| 5,732,273 A | 3/1998 | Srivastava et al. | |
| 5,774,728 A | 6/1998 | Breslau et al. | |
| 7,010,685 B1 * | 3/2006 | Candelore | H04N 21/63345 |
| | | | 380/280 |

(Continued)

FOREIGN PATENT DOCUMENTS

| | | |
|---|---|---|
| EP | 1 535 177 B1 | 8/2017 |
| WO | 2016/116132 A1 | 7/2016 |

OTHER PUBLICATIONS

Foreign Office Action from the Taiwan Patent Office dated Oct. 30, 2024 and its translation in English. Taiwan Patent Application No. 112144509. This office action includes a rejection based on prior art reference (US20220263912).

(Continued)

*Primary Examiner* — Michael B. Pierorazio
(74) *Attorney, Agent, or Firm* — TROUTMAN PEPPER LOCKE LLP

(57) ABSTRACT

In an embodiment, content data delivery to a requesting device in a content delivery network (CDN) may be handled by a server device using a content cache of a computing device associated with the server device. The computing device may be a component of, local to, and/or directly connected to the server device. The server device receives a request to deliver the content data, determines that the location of the content data is in the content cache, and responsive to this determination, sends instructions to the computing device to provide the content data to the requesting device. In one embodiment, the server device may acquire and provide the content data to the computing device for storage in the content cache, before or in response to receiving the request to deliver the content data.

20 Claims, 9 Drawing Sheets

(56) References Cited

U.S. PATENT DOCUMENTS

| | | | |
|---|---|---|---|
| 7,068,789 B2* | 6/2006 | Huitema | H04L 67/104 |
| | | | 713/168 |
| 7,614,069 B2* | 11/2009 | Stone | H04N 21/25435 |
| | | | 725/89 |
| 7,650,624 B2* | 1/2010 | Barsoum | H04N 7/081 |
| | | | 725/23 |
| 8,032,911 B2* | 10/2011 | Ohkita | H04L 61/5038 |
| | | | 725/74 |
| 8,121,706 B2* | 2/2012 | Morikawa | H04L 12/2814 |
| | | | 725/74 |
| 8,381,310 B2* | 2/2013 | Gangotri | G06F 21/10 |
| | | | 726/32 |
| 8,418,155 B2 | 4/2013 | Mcallister et al. | |
| 8,468,510 B1 | 6/2013 | Sundararajan et al. | |
| 9,563,754 B2 | 2/2017 | Colnot et al. | |
| 9,946,657 B1 | 4/2018 | Muthukkaruppan et al. | |
| 10,120,661 B2 | 11/2018 | Sandberg et al. | |
| 10,162,626 B2 | 12/2018 | Mavrinac et al. | |
| 10,235,291 B1 | 3/2019 | Michaud et al. | |
| 10,270,878 B1 | 4/2019 | Uppal et al. | |
| 10,404,823 B2 | 9/2019 | Busayarat et al. | |
| 10,412,110 B2 | 9/2019 | Hamdi | |
| 10,531,130 B2 | 1/2020 | Beck | |
| 10,873,516 B2 | 12/2020 | Chris | |
| 10,938,884 B1 | 3/2021 | Baldwin et al. | |
| 10,942,852 B1 | 3/2021 | Tian | |
| 10,958,700 B1 | 3/2021 | Hassler | |
| 10,963,388 B2 | 3/2021 | Sinha et al. | |
| 10,972,761 B2 | 4/2021 | Ra et al. | |
| 11,030,104 B1 | 6/2021 | Gupta et al. | |
| 11,032,581 B2 | 6/2021 | Beck | |
| 11,061,828 B1 | 7/2021 | Peterson et al. | |
| 11,070,603 B2 | 7/2021 | Panagos et al. | |
| 11,086,960 B2 | 8/2021 | Newton | |
| 11,109,101 B1 | 8/2021 | Binder et al. | |
| 11,128,728 B2 | 9/2021 | Luft | |
| 11,134,134 B2 | 9/2021 | Uppal et al. | |
| 11,146,654 B2 | 10/2021 | Busayarat et al. | |
| 11,151,058 B2 | 10/2021 | Gupta et al. | |
| 11,159,404 B1 | 10/2021 | Kuo et al. | |
| 11,218,504 B2 | 1/2022 | Hamdi | |
| 11,218,561 B1 | 1/2022 | Mondal et al. | |
| 11,252,253 B2 | 2/2022 | Luft | |
| 11,281,804 B1 | 3/2022 | Uthaman et al. | |
| 11,297,119 B2 | 4/2022 | Hassler | |
| 11,310,334 B1 | 4/2022 | Adolphson et al. | |
| 11,323,536 B2 | 5/2022 | Luft | |
| 11,349,737 B2 | 5/2022 | Lemmons | |
| 11,356,712 B2 | 6/2022 | Ra et al. | |
| 11,388,252 B2 | 7/2022 | Luft | |
| 11,481,825 B1 | 10/2022 | Mokashi et al. | |
| 2003/0056093 A1* | 3/2003 | Huitema | H04L 67/104 |
| | | | 713/156 |
| 2004/0117856 A1* | 6/2004 | Barsoum | G06Q 30/0207 |
| | | | 348/E7.071 |
| 2004/0162105 A1* | 8/2004 | Reddy | H04W 12/06 |
| | | | 455/551 |
| 2005/0216942 A1* | 9/2005 | Barton | H04N 21/6125 |
| | | | 348/E7.071 |
| 2005/0283815 A1* | 12/2005 | Brooks | H04H 20/78 |
| | | | 725/127 |
| 2005/0289632 A1* | 12/2005 | Brooks | H04N 7/17309 |
| | | | 725/127 |
| 2006/0010481 A1* | 1/2006 | Wall | H04N 7/163 |
| | | | 725/151 |
| 2006/0111144 A1* | 5/2006 | Nakajima | H04L 67/54 |
| | | | 455/556.1 |
| 2006/0212197 A1* | 9/2006 | Butler | B60R 11/0235 |
| | | | 701/1 |
| 2006/0225105 A1* | 10/2006 | Russ | H04N 7/17318 |
| | | | 348/E7.071 |
| 2007/0050822 A1* | 3/2007 | Stevens | H04N 7/14 |
| | | | 725/74 |
| 2007/0067808 A1* | 3/2007 | DaCosta | H04N 21/6581 |
| | | | 348/E7.071 |
| 2007/0079341 A1* | 4/2007 | Russ | H04N 21/43615 |
| | | | 725/89 |
| 2007/0101185 A1* | 5/2007 | Ostrowka | H04N 21/4334 |
| | | | 714/6.13 |
| 2007/0124775 A1* | 5/2007 | DaCosta | H04N 21/6582 |
| | | | 348/E7.071 |
| 2007/0130601 A1* | 6/2007 | Li | H04L 65/611 |
| | | | 725/112 |
| 2007/0157281 A1* | 7/2007 | Ellis | H04N 21/4147 |
| | | | 725/74 |
| 2007/0282990 A1* | 12/2007 | Kumar | H04L 65/80 |
| | | | 709/223 |
| 2008/0013919 A1* | 1/2008 | Boston | G11B 19/00 |
| 2008/0092168 A1* | 4/2008 | Logan | H04N 21/4622 |
| | | | 725/44 |
| 2008/0134245 A1* | 6/2008 | DaCosta | H04N 21/482 |
| | | | 348/E7.071 |
| 2008/0134256 A1* | 6/2008 | DaCosta | H04N 21/43615 |
| | | | 348/E7.071 |
| 2008/0155615 A1* | 6/2008 | Craner | H04N 7/17318 |
| | | | 348/E7.071 |
| 2008/0178252 A1* | 7/2008 | Michaud | H04L 63/083 |
| | | | 726/1 |
| 2008/0235733 A1* | 9/2008 | Heie | H04N 21/482 |
| | | | 725/46 |
| 2008/0244658 A1* | 10/2008 | Chen | H04N 21/47211 |
| | | | 348/E7.071 |
| 2008/0263611 A1* | 10/2008 | Lecomte | H04N 21/47202 |
| | | | 348/E7.071 |
| 2009/0183199 A1* | 7/2009 | Stafford | H04N 7/165 |
| | | | 725/34 |
| 2009/0205010 A1* | 8/2009 | Rodriguez | H04N 21/4402 |
| | | | 725/151 |
| 2009/0313662 A1* | 12/2009 | Rodriguez | H04N 19/39 |
| | | | 725/87 |
| 2010/0005483 A1* | 1/2010 | Rao | H04N 21/63345 |
| | | | 725/25 |
| 2010/0071076 A1* | 3/2010 | Gangotri | G06F 21/10 |
| | | | 726/32 |
| 2010/0125876 A1* | 5/2010 | Craner | H04N 21/4331 |
| | | | 725/37 |
| 2011/0191439 A1* | 8/2011 | Dazzi | G06F 15/16 |
| | | | 709/217 |
| 2011/0191446 A1* | 8/2011 | Dazzi | H04L 65/612 |
| | | | 709/219 |
| 2012/0126851 A1 | 5/2012 | Kelem et al. | |
| 2012/0309515 A1* | 12/2012 | Chung | H04N 21/812 |
| | | | 463/31 |
| 2016/0188340 A1 | 6/2016 | Fushimi | |
| 2017/0052830 A1 | 2/2017 | Gambardella et al. | |
| 2020/0068036 A1 | 2/2020 | Panagos et al. | |
| 2020/0259918 A1 | 8/2020 | Luft | |
| 2021/0224200 A1 | 7/2021 | Gupta et al. | |
| 2021/0227264 A1 | 7/2021 | Ra et al. | |
| 2021/0255964 A1 | 8/2021 | Gupta et al. | |
| 2021/0255965 A1 | 8/2021 | Gupta et al. | |
| 2021/0255967 A1 | 8/2021 | Gupta et al. | |
| 2021/0263863 A1 | 8/2021 | Peterson et al. | |
| 2021/0279174 A1 | 9/2021 | Peterson et al. | |
| 2022/0019440 A1 | 1/2022 | Gorti et al. | |
| 2022/0027267 A1 | 1/2022 | Gupta et al. | |
| 2022/0027272 A1 | 1/2022 | Ki et al. | |
| 2022/0116669 A1 | 4/2022 | Guim Bernat | |
| 2022/0188174 A1 | 6/2022 | Bairavasundaram et al. | |
| 2022/0188242 A1 | 6/2022 | Tanpairoj et al. | |
| 2022/0263912 A1 | 8/2022 | Devanagondi et al. | |

OTHER PUBLICATIONS

Written opinion and International Search Report for a PCT application PCT/US2023/036440.

* cited by examiner

APPLICATION CACHE ACCELERATION USING DEVICE CONTENT CACHE

TECHNICAL FIELD

The disclosure generally relates to accelerating application cache usage, and more particularly using a device's content cache to accelerate application cache usage.

BACKGROUND

In a typical content delivery network (CDN), edge cluster servers are configured to receive requests for content from downstream devices, retrieve the content from one or more upstream source devices or networks, and deliver the retrieved content to each device which has requested the content via one or more downstream networks.

In these CDNs, the retrieval of the content and delivery to the requesting device are performed on a one-to-one basis. Therefore, for popular content which is being requested and consumed by multiple devices at once, large amounts of data need to be transmitted from the source, through the network to the edge cluster server, and then further through the network to each requesting device.

BRIEF DESCRIPTION OF THE DRAWINGS

Reference symbols in the various drawings that have the same number indicate like elements.

DETAILED DESCRIPTION

Figure 1:
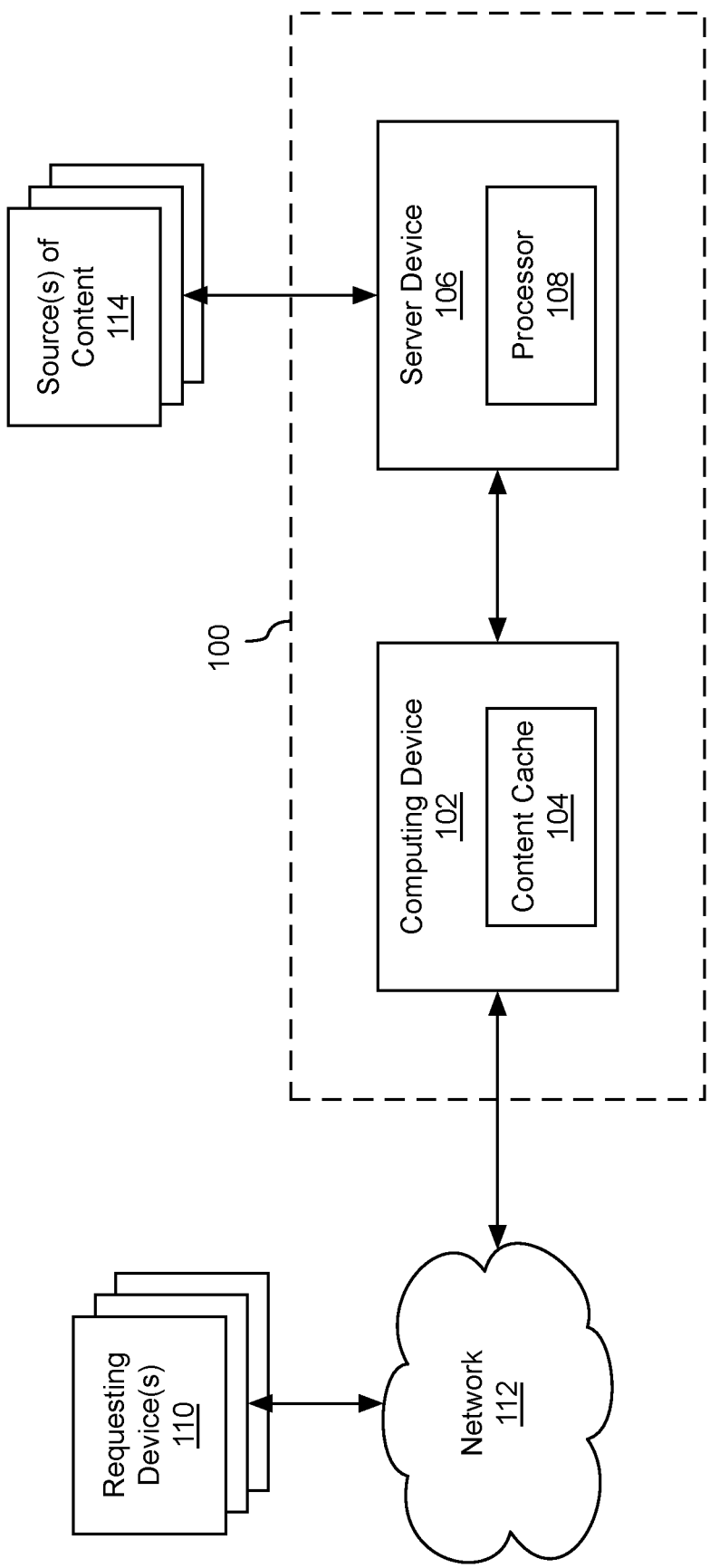
FIG. 1 illustrates an example system for content delivery using a content cache in accordance with one or more embodiments.

In the following descriptions, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

The descriptions presented herein relay sufficient information to enable a person having ordinary skill in the art to make and use the present invention and are provided in the context and requirements of particular embodiments of the present invention.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms. In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

1. GENERAL OVERVIEW
2. SYSTEM ARCHITECTURE
   2.1 SYSTEM HAVING EMBEDDED CONTENT CACHE FOR CONTENT DATA DELIVERY
   2.2 SYSTEM USING CONTENT CACHE FOR CONTENT DATA DELIVERY
3. EXAMPLE EMBODIMENTS
   3.1 DATA FLOW BETWEEN DEVICES FOR CONTENT DATA DELIVERY
   3.2 DATA EXCHANGE IN AN EXAMPLE SYSTEM
   3.3 DELIVERING CONTENT DATA TO A REQUESTING DEVICE
   3.4 STORING CONTENT DATA IN A CONTENT CACHE
   3.5 ACQUIRING CONTENT DATA FROM A CONTENT CACHE
4. MISCELLANEOUS; EXTENSIONS
5. HARDWARE OVERVIEW

1. General Overview

In an embodiment, content data delivery to a requesting device in a content delivery network (CDN) may be handled by a server device using a content cache of a computing device associated with the server device. The computing device may be a component of, local to, and/or directly connected to the server device. The server device receives a request to deliver the content data, determines that the location of the content data is in the content cache, and responsive to this determination, sends instructions to the computing device to provide the content data to the requesting device.

In one embodiment, the server device may acquire and provide the content data to the computing device for storage in the content cache, before or in response to receiving the request to deliver the content data.

In one or more embodiments, the server device may determine whether the content data should be stored in the content cache prior to instructing and sending the content data to be stored in the content cache. This determination may be based on a number of factors related to how the content data is being utilized within the CDN, such as demand, popularity, frequency of use, size, age, etc.

In one or more embodiments, a hardware processor receives the request from the requesting device to deliver the content data. The hardware processor may be a component of a network interface card (NIC) associated with the server device. The NIC may be a component of the server device or in electrical communication with the server device. In response to this request, the hardware processor transmits a first message to a software processor of the server device requesting a location of the content data. The software processor may be a central processing unit (CPU), graphics processing unit (GPU), or some other type of integrated circuit (IC) configured to executing a software program. The software processor determines the location of the content data. When the content data is located in the content cache, the software processor transmits a second message to the hardware processor indicating that the content data is stored in the content cache. As a result, the hardware processor retrieves the content data from the content cache and delivers it to the requesting device.

This Specification may include, and the claims may recite, some embodiments beyond those that are described in this General Overview section.

2. System Architecture 2.1 System Having Embedded Content Cache for Content Data Delivery FIG. 1 illustrates an example system 100 for content data delivery using an embedded content cache 104 in computing device 102. System 100 includes a server device 106 electronically coupled with computing device 102 that is associated with the server device 106. In one or more embodiments, server device 106 includes a hardware processor 108 and is configured to provide content to the at least one of the requesting devices 110. Server device 106, in some embodiments, also includes a memory device for storing instructions and/or content and/or a software processor for executing software program(s).

Server device 106 may be coupled with one or more sources 114 of content. Source(s) 114 may include any device, network, and/or storage accessible to server device 106 from which content may be retrieved and/or requested for delivery to requesting devices 110. Some example source(s) 114 include, but are not limited to, the Internet, a streaming service, a content server, cache and/or memory of server device 106, etc. Server device 106 may be connected to source(s) 114 via a fabric relay, in one approach, and/or via one or more additional networks.

Computing device 102 may include any hardware device that includes a hardware processor and memory, such as a NIC, a network interface controller, a network adaptor, physical network interface, etc. In system 100, according to one embodiment, computing device 102 includes a content cache 104 for storage of content data provided by server device 106 that enables fast retrieval of content data to satisfy requests from the requesting device(s) 110. Content cache 104 may include any type of memory, such as a non-volatile random-access memory (NVRAM), a programmable read-only memory (PROM), an erasable PROM (EPROM), a FLASH-EPROM, content-addressable memory (CAM), ternary content-addressable memory (TCAM), etc. In some embodiments, content cache 104 includes very fast access memory types to enable content data delivery with a minimum of delay through network 112.

In an embodiment, content cache 104 may be embedded in computing device 102. An embedded content cache 104, in several non-limiting examples, may be a component within computing device 102, may be resident upon a printed circuit board of computing device 102, may be an electronics chip plugged into a socket of a printed circuit board of computing device 102, etc.

Computing device 102 is electronically coupled to the network 112 for connecting to requesting device(s) 110. Requesting device(s) 110 may also be electronically coupled to network 112, and/or a component within network 112 in various embodiments. Network 112 may include one or more network devices disposed within network 112 at appropriate locations for routing, transmitting, switching, and processing data within network 112 and to/from devices external to network 112. The network device(s) may be configured to operate a data plane and a control plane, in various approaches, and are configured to connect various devices within and/or external to network 112. Network 112 may be a wireline network, a wireless network, or a combination thereof. In one embodiment, network 112 may be an edge network, e.g., for wireless requesting devices.

For a wireless network, network device(s) may include one or more Gi local area network (LAN) devices, N6 LAN devices, packet data network gateway (P-GW) devices, serving gateway (S-GW) devices, evolved packet core (EPC) devices, mobile backhaul (MBH) devices, wireless routers, wireless switches, radio receiver devices, radio transmitter devices, etc.

For a wireline network, network device(s) may include one or more broadband network gateway (BNG) devices, residential gateway (RG) devices, customer premises equipment (CPE) devices, ethernet devices, fiber devices, routers, switches, etc.

In one embodiment, a requesting device 110 may be a set-top box installed at a consumer site (such as a home, a restaurant, etc.), subscriber-premise-equipment in an enterprise or business, etc.

In one embodiment, server device 106 runs the application stack to process application-layer requests from requesting device(s) 110 and executes all the application policy and business logic for servicing such requests, including application-layer protocols such as, hypertext transfer protocol (HTTP), hypertext transfer protocol secure (HTTPS), web real-time communication (WebRTC), etc. Server device 106 also runs the transport stack to communicate with each requesting device 110. For example, transmission control protocol (TCP)/internet protocol (IP), user datagram protocol (UDP), QUIC, and/or other transport layer protocols. Because server device 106 manages the application stack and transport stack, this functionality is not resident on computing device 102, conserving its processing capacity and allowing computing device 102 to operate with any application protocol, including but not limited to, HTTP/1.1, HTTP/2, HTTP/3, WebRTC, etc.

In an approach, server device 106 may be located proximate and/or near to computing device 102, such as in the same enclosure, in the same room, in the same server rack, in the same chassis, etc. In this approach, server device 106 may share resources (e.g., processors, memory, connections, etc.) with computing device 102. In a further approach, computing device 102 (and content cache 104) may be components of server device 106.

In another approach, content cache 104 of computing device 102 may be physically located remote from server device 106, such as in a different room, different building, different site, different city, different country, etc. However, even when located remotely, content cache 104 may be managed by server device 106.

Server device 106 may also be configured to handle all management, processing, security, and policy decisions for the application-layer across network 112. Therefore, an application-layer request for content data will be transmitted to server device 106 for processing, as other devices within network 112 will typically be unable to understand and/or process the application-layer request. Other application-layer related data may also be forwarded to server device 106 for processing in additional embodiments, instead of being handled by any other devices in network 112 or computing device 102.

In one embodiment, content cache 104 may be treated as a universal cache for storing content therein, as directed by server device 106, thereby enabling the data stored in the content cache 104 to be controlled by server device 106. In one embodiment, content cache 104 is configured to operate with any application protocol, including but not limited to, HTTP/1.1, HTTP/2, HTTP/3, WebRTC, etc.

Server device 106 may control what data is stored to content cache 104 by sending instructions to the computing device 102. Computing device 102 is configured to store content data (and possibly other data, such as metadata, non-content information, etc.) to content cache 104 upon receiving the content data, e.g., from server device 106. Computing device 102 is also configured to retrieve content data from content cache 104, and deliver the retrieved content data to one or more requesting devices 110, such as in response to an application-layer request for content data sent by the requesting device(s) 110 and processed by server device 106.

In one embodiment, the computing device 102 may include a command-aware hardware architecture which is configured to generate and/or execute command bundles, including command bundles sent from server device 106. The command-aware hardware architecture may be implemented in a field programmable gate array (FPGA), application specific integrated circuit (ASIC), or some other hardware device that is able to efficiently process command bundles.

Each command bundle is an "executable" that encodes all or some operations to be performed. A command bundle is a compact, generic, hardware-independent format that may be used to describe any program to be executed on a command-aware hardware architecture.

Each command in a command bundle is a logically independent and atomic operation. Each command is potentially complex in that it may require multiple discrete functions to be performed to execute the command. Each command also clearly defines a set of inputs (data and arguments, which may be null) and a set of outputs (which may simple or complex, e.g., a flag, 0 or 1, an argument, a value or set of values, a function, etc.).

Server device 106 may transmit a command bundle to computing device 102 for execution thereof by a single hardware platform. The command bundle may include instructions for how to handle content data, where to find content data, where to deliver content data, etc. Accordingly, each command in a command bundle may be executed on a single hardware entity. That single hardware entity may be the entirety of the command-aware hardware architecture of computing device 102 in one approach. In another approach, that single hardware entity may be a single hardware module in a command-aware hardware processor of another device in network 112. Multiple commands in a command bundle may be executed on the same hardware entity, one command at a time.

In one approach, instructions may be sent by the application device in a command bundle. In a further embodiment, a command bundle may include content, such as one or more parameters or arguments, with or within the command bundle. This command bundle may also include instructions, as a set of commands, that dictate instructions for how to handle content, where to find content, where to store the content, where to deliver content, etc.

In one or more embodiments, system 100 may include more or fewer components than the components illustrated in FIG. 1. The components illustrated in FIG. 1 may be local to or remote from each other. The components illustrated in FIG. 1 may be implemented in hardware and/or software in various approaches. Operations described with respect to one component may instead be performed by another component.

In one or more embodiments, a data repository may be used to store information for system 100 and may be any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as system 100. Alternatively, or additionally, a data repository may be implemented or executed on a computing system separate from system 100. Also, a data repository may be communicatively coupled to any device in system 100 for transmission and receipt of data via a direct connection or via a network.

When a particular requesting device 110 generates a request for content data, this request is transmitted through network 112 to server device 106. Computing device 102 may receive the request and then provide it to server device 106 in one approach. Server device 106 processes this content request, determines where the content data is located to satisfy the request, obtains the content data, and transmits the content data out through the network 112 to the requesting device 110.

2.2 System Using Content Cache for Content Data Delivery

Figure 2:
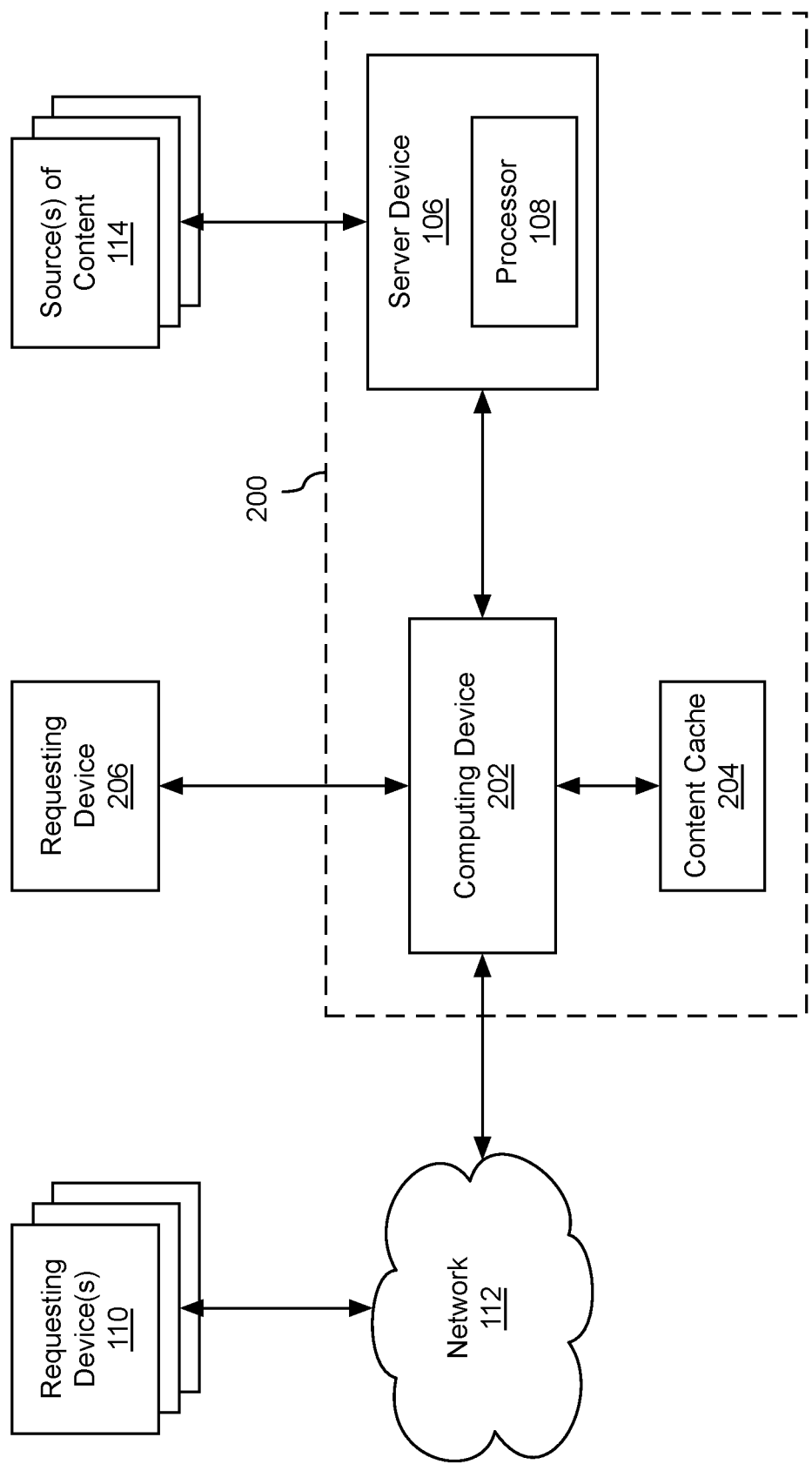
FIG. 2 illustrates an example system for content delivery using a content cache in accordance with one or more embodiments.

FIG. 2 illustrates an example system 200 for content data delivery using a content cache 204 associated with computing device 202. System 200 includes a server device 106 electronically coupled with computing device 202 that is associated with the server device 106. In one or more embodiments, server device 106 includes a hardware processor 108 and is configured to provide content to the at least one of the requesting devices 110. Server device 106, in some embodiments, also includes a memory device for storing instructions and/or content and/or a software processor for executing software program(s).

Server device 106 may be coupled with one or more sources 114 of content. Source(s) 114 may include any device, network, and/or storage accessible to server device 106 from which content may be retrieved and/or requested for delivery to requesting devices 110. Some example source(s) 114 include, but are not limited to, the Internet, a streaming service, a content server, cache and/or memory of server device 106, etc. Server device 106 may be connected to source(s) 114 via a fabric relay, in one approach, and/or via one or more additional networks.

Computing device 202 may include any hardware device that includes a hardware processor and memory, such as a NIC, a network interface controller, a network adaptor, physical network interface, etc. In system 200, according to one embodiment, computing device 202 may be electronically coupled with a requesting device 206 directly without utilizing network 112. In this way, computing device 202 is able to provide content data very quickly to requesting device 206, which may be located locally to computing device 202.

Computing device 202 is associated with a content cache 204 for storage of content data provided by server device 106 that enables fast retrieval of content data to satisfy requests from the requesting device(s) 110 and/or requesting device 206. Content cache 204 may include any type of memory, such as a NVRAM, a PROM, an EPROM, a FLASH-EPROM, CAM, TCAM, etc. In some embodiments, content cache 204 includes very fast access memory types to enable content data delivery with a minimum of delay through network 112 and/or directly to requesting device 206.

In an embodiment, content cache 204 may be located locally to computing device 202. In another embodiment, content cache 204 may be separately or remotely located from computing device 202.

Other actions described in FIG. 1 are operable within the architecture of FIG. 2 in various embodiments. In one or more embodiments, system 200 may include more or fewer components than the components illustrated in FIG. 2. The components illustrated in FIG. 2 may be local to or remote from each other. The components illustrated in FIG. 2 may be implemented in hardware and/or software in various approaches. Operations described with respect to one component may instead be performed by another component.

In one or more embodiments, a data repository may be used to store information for system 200 and may be any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as system 200. Alternatively, or additionally, a data repository may be implemented or executed on a computing system separate from system 200. Also, a data repository may be communicatively coupled to any device in system 200 for transmission and receipt of data via a direct connection or via a network.

3. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

3.1 Data Flow Between Devices for Content Data Delivery

Figure 3:
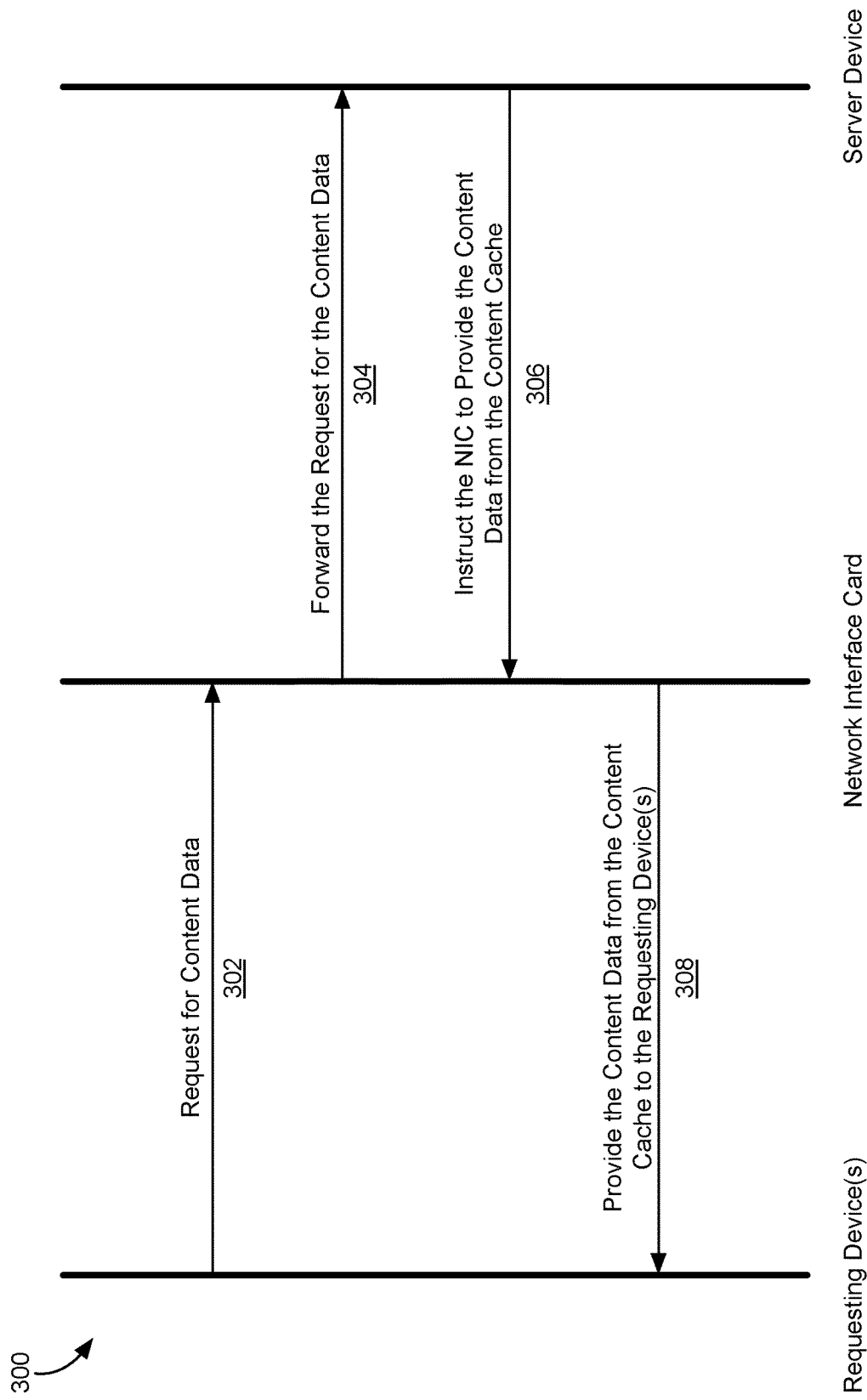
FIG. 3 illustrates an example message flow between devices in accordance with one or more embodiments.

FIG. 3 illustrates an example data flow 300 between devices in accordance with one or more embodiments. In this description, the computing device is treated as a NIC of the server device. However, this is not required in the various embodiments described herein, and is simply used as a way of relating the exchange of messages between the various devices. Any of the singular messages described in relation to FIG. 3 may include multiple messages that divide up data across the multiple messages.

Message 302 is a request for particular content data that is transmitted from the requesting device(s) to the NIC. Upon receiving message 302, the NIC forwards message 302 and/or transmits another message 304 that includes the information and request contained in message 302, to the server device. The server device is configured to handle these types of requests, and when the server device determines that the content data is already stored to a content cache of the NIC, the server device instructs the NIC to provide the content data from the content cache in message 306. Message 306 may include a storage location where the NIC will find the content data stored in the content cache in one approach. Once the NIC obtains the content data, the NIC provides the content data from the content cache to the requesting device(s) in message 308.

The data flow 300 may further include encapsulation operations, compression operations, encryption operations, or any other packet or message modification techniques that enable more secure, more efficient, and/or more reliable transmissions of data, in various approaches.

Figure 4:
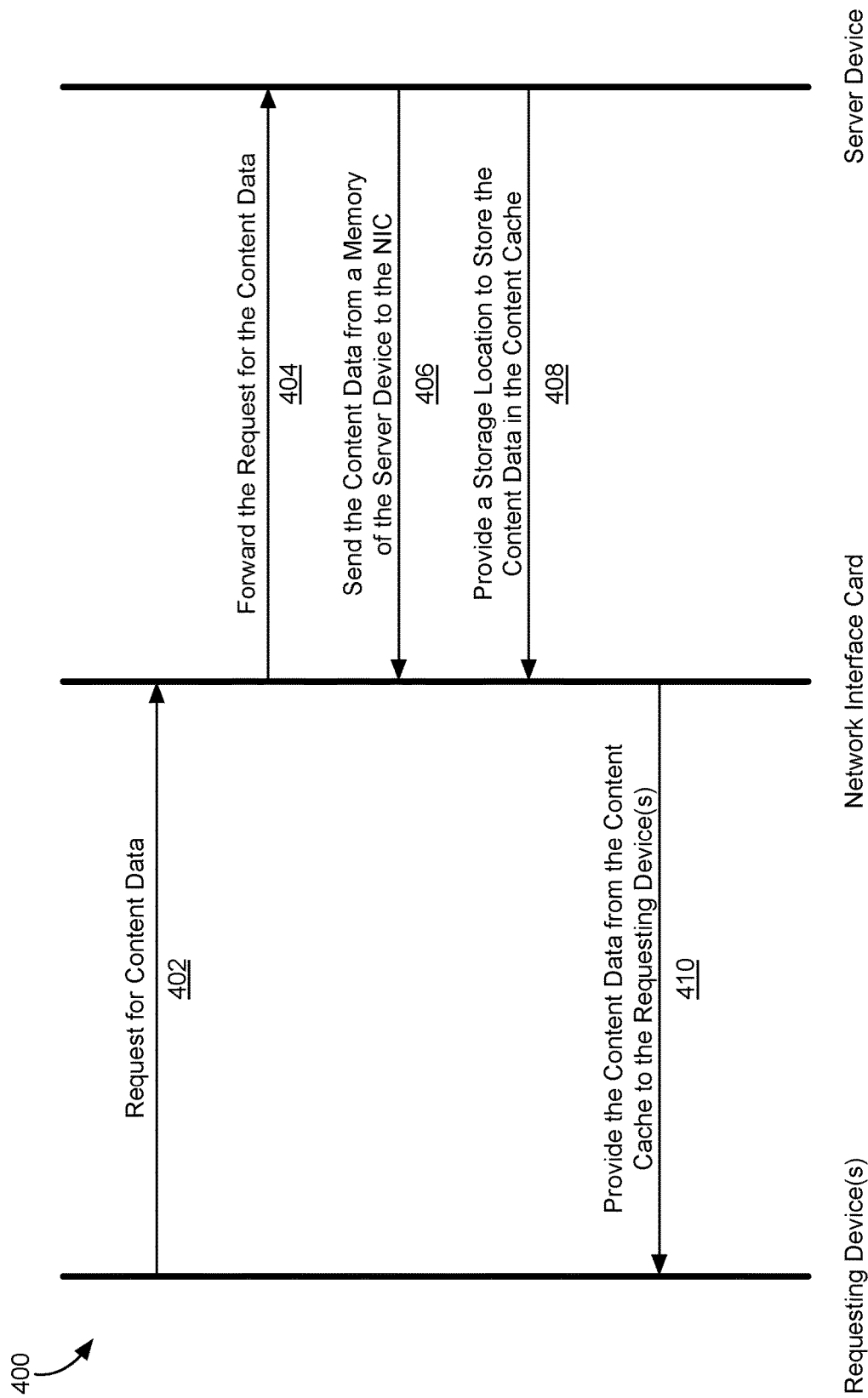
FIG. 4 illustrates an example message flow between devices in accordance with one or more embodiments.

FIG. 4 illustrates an example data flow 400 between devices in accordance with one or more embodiments. In this description, the computing device is treated as a NIC of the server device. However, this is not required in the various embodiments described herein, and is simply used as a way of relating the exchange of messages between the various devices. Any of the singular messages described in relation to FIG. 4 may include multiple messages that divide up data across the multiple messages.

Message 402 is a request for particular content data that is transmitted from the requesting device(s) to the NIC. Upon receiving message 402, the NIC forwards message 402 and/or transmits another message 404 that includes the information and request contained in message 402, to the server device. The server device is configured to handle these types of requests, and after acquiring the requested content data from a memory of the server device, sends the content data in message 406 to the NIC. In addition, in message 408, the server device provides a storage location for the NIC to store the content data in content cache of the NIC. In this way, the server device will always know where that particular content data is stored within the content cache of the NIC, in case any subsequent request for the same content data is received.

In conjunction with storing the content data in the content cache at the location specified by the server device, the NIC provides the content data from the content cache to the requesting device(s) in message 410.

The data flow 400 may further include encapsulation operations, compression operations, encryption operations, or any other packet or message modification techniques that enable more secure, more efficient, and/or more reliable transmissions of data, in various approaches.

3.2 Data Exchange in an Example System

Figure 5:
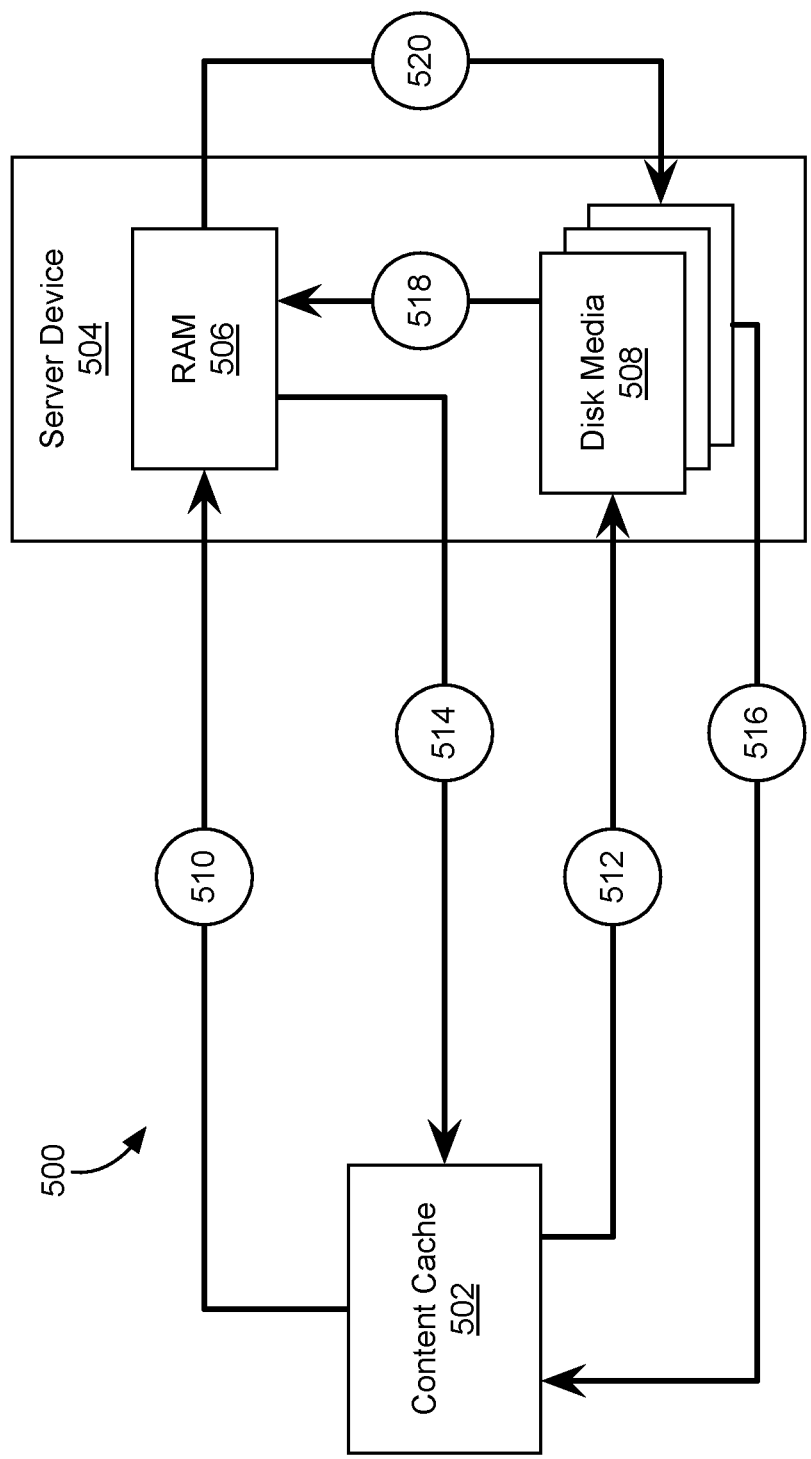
FIG. 5 illustrates data exchange in an example system for retrieving content data from content cache in accordance with one or more embodiments.

FIG. 5 illustrates data exchange in an example system 500 for retrieving content data from content cache in accordance with one or more embodiments.

System 500 includes a content cache 502 and a server device 504. Content cache 502 may include any type of memory, such as a NVRAM, a PROM, an EPROM, a FLASH-EPROM, CAM, TCAM, etc.

As shown, server device 504 includes RAM 506 for fast data storage and retrieval and one or more disk media 508 for longer term data storage. Although not explicitly shown, other types of memory storage may be used in place of or in conjunction with RAM 506 and disk media 508 in accordance with various embodiments, such as those other memory types described herein, or others known in the art.

Content data may have characteristics and parameters associated with the content data that may be useful in determining where to store the content data within system 500. Disk media 508 provides for lost cost longer term storage but does not provide as fast of retrieval as does content cache 502 and/or RAM 506. Therefore, certain characteristics of the content data may be tracked and/or monitored to determine where to store the content data. Some example characteristics include popularity and/or demand for the content data. As certain content data is determined to be more popular and demanded more frequently by requesting devices, the server device may determine to place the certain content data in content cache 502.

Therefore, content data that is lowest in demand, least popular, easiest to retrieve, etc., may be placed in disk media 508. Once this content data stored to disk media 508 achieves a threshold popularity, accrues a threshold number of requests, is demanded a threshold number of times within a time period, etc., the content data may be moved 518 from disk media 508 to RAM 506. However, this same content data may be moved 520 from RAM 506 to disk media 508 should any of those parameters fall below threshold levels to maintain the content data in RAM 506.

In another example, content data stored to disk media 508 that achieves a greater threshold popularity, accrues a greater threshold number of requests, is demanded a greater threshold number of times within a time period, etc., may be moved 516 from disk media 508 directly to content cache 502. However, this same content data may be moved 512 to disk media 508 should any of those parameters fall below threshold levels to maintain the content data in content cache 502 or in RAM 506.

In an example, content data that is stored to RAM 506 that achieves a certain threshold popularity, accrues a certain threshold number of requests, is demanded a certain threshold number of times within a time period, etc., may be moved 514 from RAM 506 to content cache 502. However, this same content data may be moved 510 to RAM 506 should any of those parameters fall below threshold levels to maintain the content data in content cache 502.

Intelligent placement and movement of content data into and out of the content cache 502 may be performed during delivery from persistent storage (e.g., reading the content data from the content cache 502) to temporary storage (e.g., providing to CPU Cache, RAM 506, other device memory 508, etc.).

The data flow 500 may further include encapsulation/decapsulation operations, compression/expansion operations, encryption/decryption operations, or any other packet or message modification techniques that enable more secure, more efficient, and/or more reliable transmissions of content data, in various approaches.

3.3 Delivering Content Data to a Requesting Device

Figure 6:
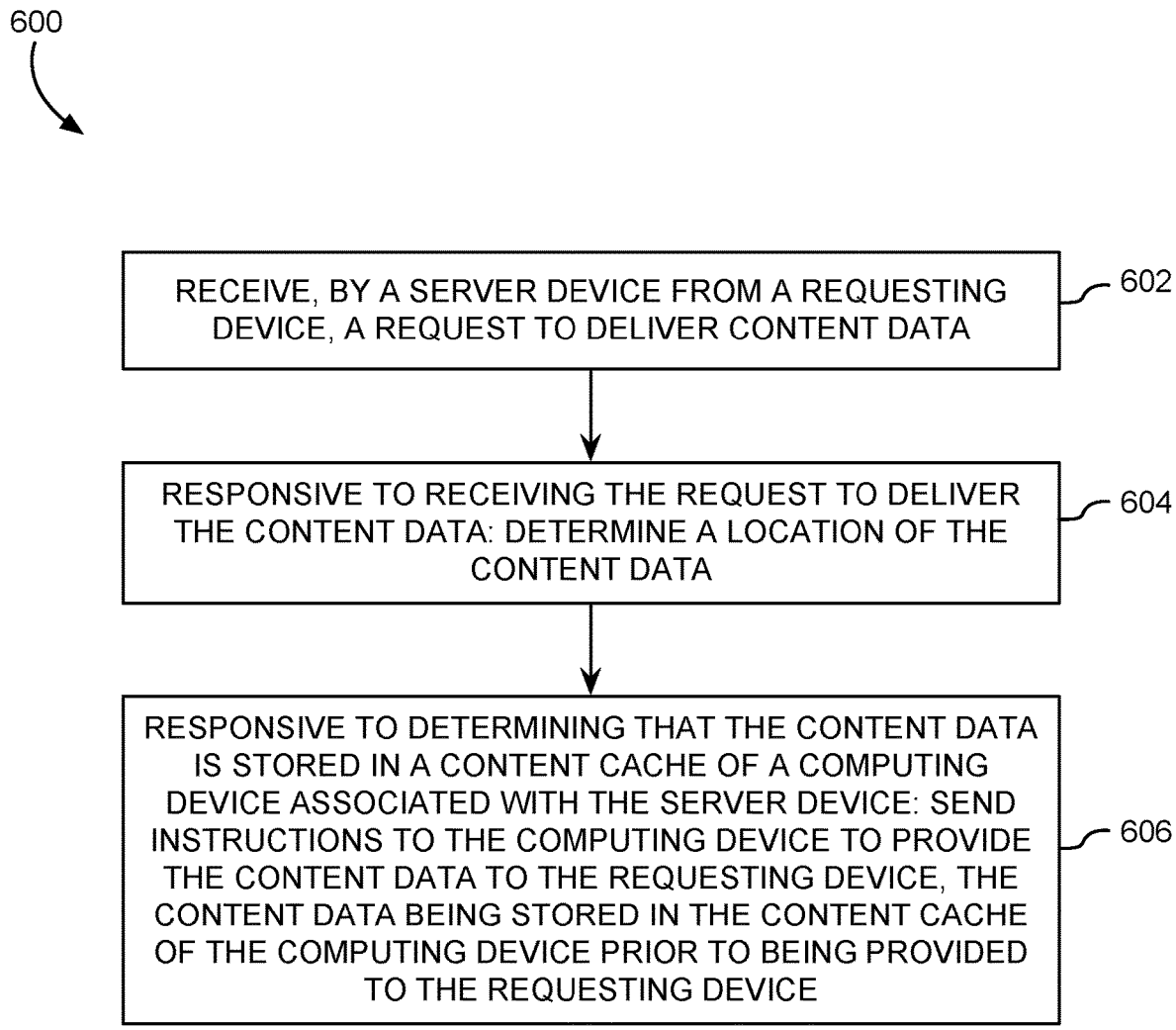
FIG. 6 is a flow diagram of an example method for delivering content data to a requesting device in a CDN.

FIG. 6 is a flow diagram of an example method 600 for delivering content data to a requesting device in a CDN in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments. In one embodiment, a computing device of a CDN may perform method 600 to provide content for one or more end-user devices. In other embodiments, method 600 may be performed by software and/or a hardware device in the network. For the remainder of the descriptions of FIG. 6, method 600 will be described from the perspective of a server device that serves content to devices connected to the CDN.

In operation 602, the server device receives, from a requesting device, a request to deliver content data. The request may be received across any communications channel, such as a wired or wireless network, the Internet, a direct connection, a radio frequency (RF) and/or Bluetooth™ connection, a near-field communication (NFC) channel, etc. The requesting device may be any device in electrical communication with the server device. In an example, the requesting device may be a consumer of content data, such as a set top box, streaming device, smart television, smart phone, tablet computer, gaming console or computer, etc.

The request may include information that enables the server device to determine what content data is being requested. In an approach, the information may include an identifier specific to the requested content data, e.g., a digital object identifier (DOI), a universal product code (UPC), etc. In an embodiment, the information may include a location where the requested content data may be accessed and/or retrieved by the server device.

In one embodiment, the server device is configured to operate in a CDN shared by one or more devices that consume content delivered by the server device.

In operation 604, the server device determines a location of the content data in response to receiving the request to deliver the content data. In one embodiment, the location may be included in the request and/or referenced by the request in a way that enables the server device to locate and/or acquire the requested content data.

In one example, the request includes a reference to a location of the content data in content cache of a computing device associated with the server device. In another example, the server device may have previous knowledge or information that indicates that the requested content data is available at a specific location. This previous knowledge or information may be available to the server device based on previously providing the requested content data from this particular location to the same or a different requesting device, by receiving confirmation of where the content data is stored, by polling other devices in a network (such as a CDN) regarding data stored to their individual content caches or other storage devices, etc.

In operation 606, the server device sends instructions to the computing device to provide the content data to the requesting device in response to determining that the content data is stored in a content cache of a computing device associated with the server device. In this embodiment, the content data is stored in the content cache of the computing device prior to being provided to the requesting device, and the server device makes a determination that the content data is stored in the content cache of this computing device for obtaining and delivering to the requesting device.

According to one embodiment, the computing device may include a command-aware hardware processor configured to generate and/or execute command bundles. The command-aware hardware processor may be implemented in a field programmable gate array (FPGA), application specific integrated circuit (ASIC), a NIC, a server co-processor, or some other hardware device that is able to efficiently process command bundles.

In various approaches, the command bundles that are executable by the computing device may be provided by and/or received from the server device, a component of the computing device, another server device, through a network such as the CDN, etc. In an example, the computing device may be a NIC in electronic communication with the server device.

Each command bundle is an "executable" that encodes all or some operations that are to be performed by the computing device. A command bundle is a compact, generic, hardware-independent format that may be used to describe any program to be executed on a command-aware hardware processor. Each command in a command bundle is a logically independent and atomic operation. Each command is potentially complex in that it may require multiple discrete functions to be performed to execute the command. Each command also clearly defines a set of inputs (data and arguments, which may be null) and a set of outputs (which may simple or complex, e.g., a flag, 0 or 1, an argument, a value or set of values, a function, etc.).

According to one embodiment, the computing device may be a component and/or located local to the server device, e.g., a NIC of the server device for interfacing with a network (e.g., a CDN). By located local, what is meant is that the computing device may be in the same server rack as the server device, located in a same server room as the server device, and/or located in a same building as the server device.

In an approach, method 600 may include additional operations that are performed in response to sending the instructions to the computing device to provide the content data. These additional operations may include retrieving the content data from the content cache of the computing device and delivering the content data to the requesting device. In this approach, the computing device may be a NIC of the server device, and in response to determining that the requested content data is available in the content cache of the NIC, the server device may retrieve the requested content data from this local content cache and deliver it to the requesting device.

According to one embodiment, prior to providing the content data to the requesting device, the server device may cause the content data to be stored in the content cache of the computing device. Causing the content data to be stored in the content cache may include instructing and/or directing the computing device to store the content data in the content cache, providing an address for storage of the content cache, directly storing the content data in the content cache, etc.

Moreover, in a further embodiment, prior to storing the content data in the content cache of the computing device, the server device (or some other component or device in the network) may process the content data. Processing the content data may include, but is not limited to, one or more of the following actions: compression and/or decompression, transcoding, tunnel processing, network transport protocol processing, encryption and/or decryption, etc. In this way, the content data may be modified and/or altered in some way that enables faster delivery to a requesting device upon retrieval from the content cache of the computing device.

In one embodiment, the server device (or some other component or device in the network), prior to providing the content data to the requesting device, may process the content data. This processing may be performed by the server device regardless of whether the server device originally caused the content data to be stored to the content cache of the computing device. In this embodiment, the server device may process the content data by performing, without limitation, one or more of the following actions: compression and/or decompression, transcoding, tunnel processing, network transport protocol processing, encryption and/or decryption, etc. In this way, the content data may be modified and/or altered in some way that enables faster, more efficient, and/or safer delivery of the content data to a requesting device upon retrieval from the content cache of the computing device.

Tunnel processing may include encapsulation and decapsulation among other possible operations. Network transport protocol processing may include transmission control protocol (TCP) processing, transport layer security (TLS) processing, QUIC processing, etc.

In one approach, the content cache of the computing device may be physically located on the computing device. Moreover, in this approach, the content cache may be managed by the server device, such that locations of data stored to the content cache, which data is stored to the content cache, how long the stored data is retained, which data is overwritten, which data is removed, etc., may be dictated and/or directly controlled by the server device.

In one embodiment, one or more packets that include the requested content may be encapsulated in at least one overlay packet by a tunnel device in the network prior to being delivered to the requesting device. A tunnel device may be a router, server, or some other network device capable of tunnel termination and initiation within the network. In one embodiment, the server device may comprise a tunnel device and/or functionality of a tunnel device for encapsulating and decapsulating packets and overlay packets. Each overlay packet includes an overlay header. Any suitable overlay and/or tunneling method and/or protocol may be used for the overlay packet(s), such as virtual extensible local area network (VXLAN), IP Security (IPSec), general packet radio service (GPRS) tunneling protocol (GTP), etc.

3.4 Storing Content Data to a Content Cache

Figure 7:
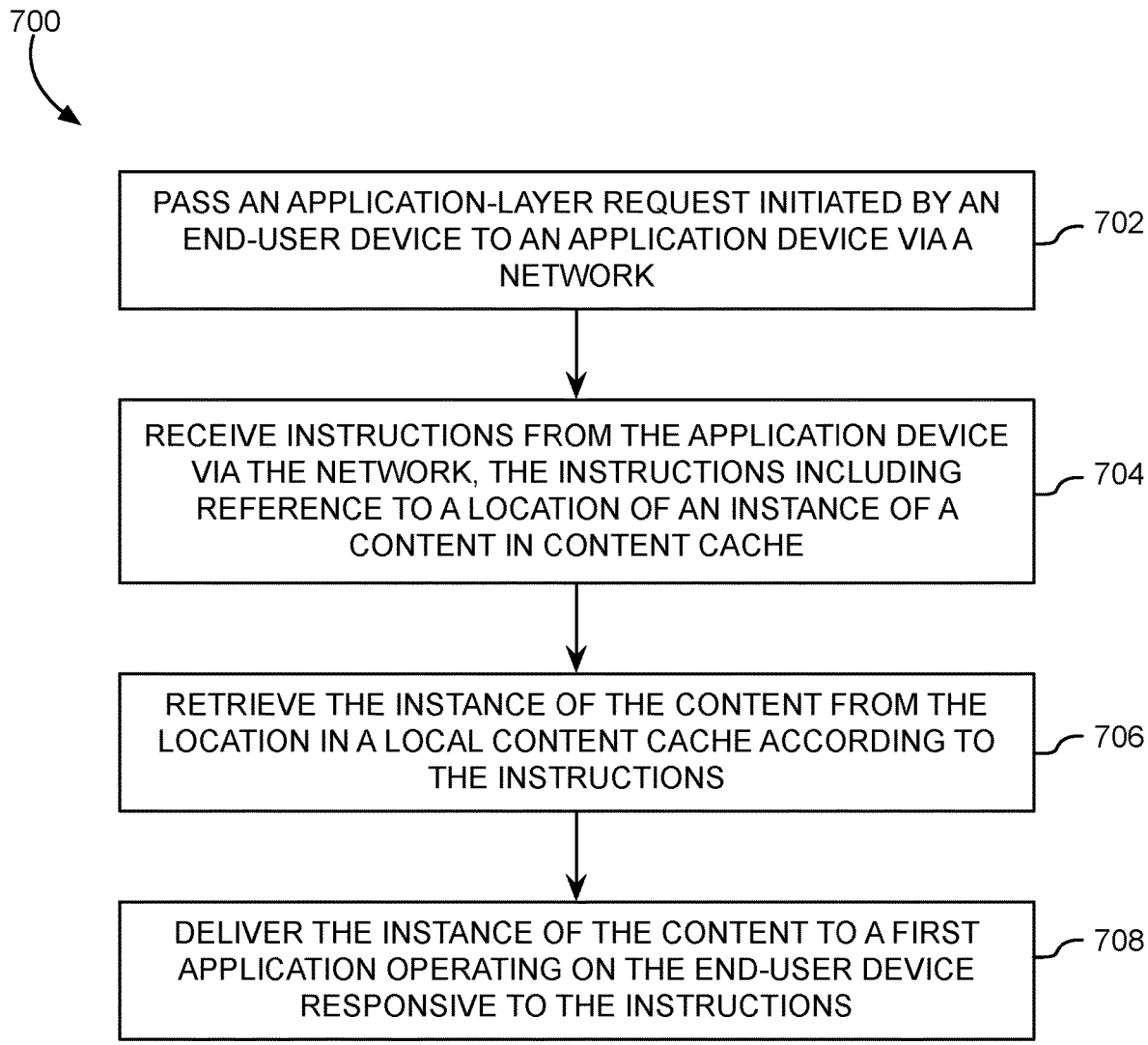
FIG. 7 is a flow diagram of an example method for storing content data in content cache.

FIG. 7 is a flow diagram of an example method 700 for storing content data in content cache in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments. In one embodiment, a computing device of a CDN may perform method 700 to provide content for one or more end-user devices. In other embodiments, method 700 may be performed by software and/or a hardware device in the network. For the remainder of the descriptions of FIG. 7, method 700 will be described from the perspective of a server device that serves content to devices connected to the CDN.

In operation 702, the server device receives a request to deliver content data from a requesting device. The request may be received across any communications channel, such as a wired or wireless network, the Internet, a direct connection, a RF and/or Bluetooth™ connection, a NFC channel, etc. The requesting device may be any device in electrical communication with the server device. In an example, the requesting device may be a consumer of content data, such as a set top box, streaming device, smart television, smart phone, tablet computer, gaming console or computer, etc.

The request may include information that enables the server device to determine what content data is being requested. In an approach, the information may include an identifier specific to the requested content data, e.g., a DOI, a UPC, etc. In an embodiment, the information may include a location where the requested content data may be accessed and/or retrieved by the server device.

In one embodiment, the server device is configured to operate in a CDN shared by one or more devices that consume content delivered by the server device.

In operation 704, the server device determines whether to store the content data in a content cache of a computing device associated with the server device. Operation 704 is performed in response to receiving the request to deliver the content data. The server device may determine whether to store the content data in the content cache based on any relevant information accessible by the server device that relates to the content cache and/or the requested content data. For example, the server device may decide to store the content data in the content cache when the content cache has space available to store the requested content data.

In one embodiment, the server device determines that an amount of data stored to the content cache of the computing device does not exceed a size threshold. Based on this determination about the size of data presently stored in the content cache, the server device may choose to store the content data to the content cache of the computing device. The size threshold may be predetermined by the server device, or a dynamic value which is adjusted based on operating conditions related to how long data is stored to the content cache, a frequency of data being requested and retrieved from the content cache, etc.

In operation 706, the server device provides the content data to the computing device for storage in the content cache of the computing device. Operation 706 is performed in response to the server device determining to store the content data in the content cache of the computing device.

According to one approach, the computing device may obtain the content data for storage in the content cache of the computing device from a storage location provided by the server device. In this approach, the server device does not obtain and provide the content data to the computing device, but instead the computing device obtains and stores the content data based on the location provided by the server device.

In an alternate approach, the server device sends the content data to the computing device for storage in the content cache of the computing device. In this approach, if the content data is not resident on the server device, the server device may search for or have previous knowledge of a current storage location of the content data, obtain the content data, and provide the content data to the computing device for storage in the content cache thereof.

In one embodiment, the content cache of the computing device may be physically located on the computing device. Moreover, in this embodiment, the content cache may be managed by the server device, such that locations of data stored to the content cache, which data is stored to the content cache, how long the stored data is retained, which data is overwritten, which data is removed, etc., may be dictated and/or directly controlled by the server device.

According to an embodiment, the server device (or some other component or device in the network) may process the content data. Processing the content data may include, but is not limited to, one or more of the following actions: compression and/or decompression, transcoding, tunnel processing, network transport protocol processing, encryption and/or decryption, etc. In this way, the content data may be modified and/or altered in some way that enables faster delivery to a requesting device upon retrieval from the content cache of the computing device. Tunnel processing may include encapsulation and decapsulation among other possible operations. Network transport protocol processing may include TCP processing, TLS processing, QUIC processing, etc.

The server device, in one embodiment, may determine that resource utilization associated with the server device exceeds a utilization threshold. In response to such a determination, the server device may move second content data from a storage location accessible to the server device (CPU Cache, RAM, other device memory, etc.) to the content cache of the computing device.

Any measurable resource may be compared to a resource utilization threshold. Some example resources include, but are not limited to, storage space in the content cache, storage space in the server device, processing capacity of the server device, processing capacity of the computing device, bandwidth of one or more delivery channels between the server device and the requesting device, energy usage of the server device, energy usage of the computing device, etc. The usage of any of these various resources may be monitored, tracked, and/or requested by the server device in order to compare against the designated usage threshold, thereby allowing the server device to understand how efficiently the various resources are being used in delivering content to requesting devices.

A value for a particular utilization threshold is related to which resource is being measured. When the resource is processing capacity, the resource utilization threshold may be a percentage of processing capacity being used, a number of processor cycles per unit of time, average processor usage, etc. When the resource is memory space, the resource utilization threshold may be a percentage or portion of the memory space that is presently storing data, an average percentage of memory space that has stored data over a period of time, etc.

In one embodiment, resource utilization may correspond to popularity and/or demand for certain content data stored to the content cache and/or server device. As certain content data is determined to be more popular and demanded more frequently by requesting devices, the server device may determine to maintain the presence of the certain content data in the content cache of the computing device even if resource utilization thresholds indicate that the certain content data should be moved out of the content cache.

Intelligent placement and movement of content data into and out of the content cache of the computing device may be performed during delivery from persistent storage (e.g., reading the content data from the content cache) to temporary storage (e.g., providing to CPU Cache, RAM, disk media, other device memory, etc.).

The server device, in one embodiment, may determine that a triggering condition associated with the content data has occurred. In response to detecting/determining that the triggering condition has occurred, the server device may evict the content data from the content cache of the computing device. A triggering condition may be related to a utilization metric for the content data and/or content cache (e.g., amount of data stored to content cache, popularity of the content data, demand for the content data, last use of the content data, etc.) falling below/above a utilization threshold. Eviction of the content data from the content cache may include, in various examples, deletion from the content cache, marking a memory space storing the content data in the content cache as free, overwriting the content data, etc.

According to one embodiment, the computing device may include a command-aware hardware processor configured to generate and/or execute command bundles. The command-aware hardware processor may be implemented in a FPGA, ASIC, a NIC, a server co-processor, or some other hardware device that is able to efficiently process command bundles. In various approaches, the command bundles that are executable by the computing device may be provided by and/or received from the server device, a component of the computing device, another server device, through a network such as the CDN, etc. In an example, the computing device may be a NIC in electronic communication with the server device.

Each command bundle is an "executable" that encodes all or some operations that are to be performed by the computing device. A command bundle is a compact, generic, hardware-independent format that may be used to describe any program to be executed on a command-aware hardware processor. Each command in a command bundle is a logically independent and atomic operation. Each command is potentially complex in that it may require multiple discrete functions to be performed to execute the command. Each command also clearly defines a set of inputs (data and arguments, which may be null) and a set of outputs (which may simple or complex, e.g., a flag, 0 or 1, an argument, a value or set of values, a function, etc.).

According to one embodiment, the computing device may be a component and/or located local to the server device, e.g., a NIC of the server device for interfacing with a network (e.g., a CDN). By located local, what is meant is that the computing device may be in the same server rack as the server device, located in a same server room as the server device, and/or located in a same building as the server device.

In one embodiment, one or more packets that include the requested content may be encapsulated in at least one overlay packet by a tunnel device in the network prior to being delivered to the requesting device. A tunnel device may be a router, server, or some other network device capable of tunnel termination and initiation within the network. In one embodiment, the server device may comprise a tunnel device and/or functionality of a tunnel device for encapsulating and decapsulating packets and overlay packets. Each overlay packet includes an overlay header. Any suitable overlay and/or tunneling method and/or protocol may be used for the overlay packet(s), such as VXLAN, IPSec, GTP, etc.

3.5 Acquiring Content Data from a Content Cache

Figure 8:
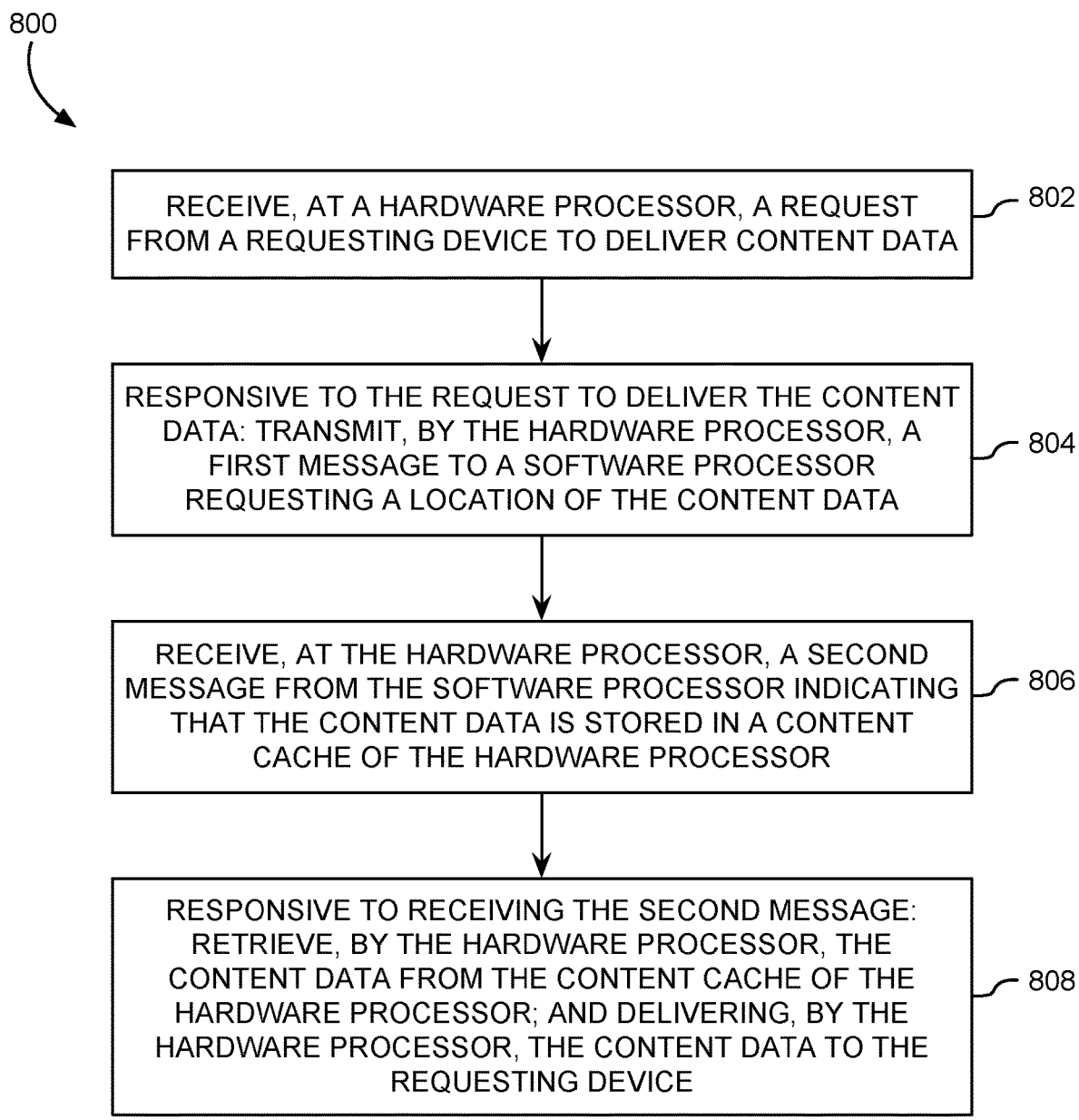
FIG. 8 is a flow diagram of an example method for acquiring content data from a content cache.

FIG. 8 is a flow diagram of an example method 800 for acquiring content data from a content cache. One or more operations illustrated in FIG. 8 may be modified, rearranged, or omitted all together. Accordingly, the particular sequence of operations illustrated in FIG. 8 should not be construed as limiting the scope of one or more embodiments. In one embodiment, a computing device of a CDN may perform method 800 to provide content for one or more requesting devices. In other embodiments, method 800 may be performed by software and/or a hardware device in the network. For the remainder of the descriptions of FIG. 8, method 800 will be described from the perspective of a hardware processor of a server device within the CDN.

In operation 802, the hardware processor receives a request from a requesting device to deliver content data. This request may specify a location of the requested content data, an identifier of the content data, and/or information that the hardware processor may use to search, find, obtain, and/or acquire the requested content data.

The request may be received across any communications channel, such as a wired or wireless network, the Internet, a direct connection, a RF and/or Bluetooth™ connection, a NFC channel, etc. The requesting device may be any device in electrical communication with the hardware processor. In an example, the requesting device may be a consumer of content data, such as a set top box, streaming device, smart television, smart phone, tablet computer, gaming console or computer, etc.

The request may include information that enables the hardware processor to determine what content data is being requested. In an approach, the information may include an identifier specific to the requested content data, e.g., a DOI, a UPC, etc. In an embodiment, the information may include a location where the requested content data may be accessed and/or retrieved by the hardware processor.

In one embodiment, the server device (and hardware processor thereof) is configured to operate in a CDN shared by one or more devices that consume content delivered by the server device.

According to one embodiment, the computing device may include a command-aware hardware processor (such as the hardware processor in operation 802) configured to generate and/or execute command bundles. The command-aware hardware processor may be implemented in a FPGA, ASIC, a NIC, a server co-processor, or some other hardware device that is able to efficiently process command bundles. In various approaches, the command bundles that are executable by the computing device may be provided by and/or received from the server device, a component of the computing device, another server device, through a network such as the CDN, etc. In an example, the computing device may be a NIC in electronic communication with the server device.

Each command bundle is an "executable" that encodes all or some operations that are to be performed by the computing device. A command bundle is a compact, generic, hardware-independent format that may be used to describe any program to be executed on a command-aware hardware processor. Each command in a command bundle is a logically independent and atomic operation. Each command is potentially complex in that it may require multiple discrete functions to be performed to execute the command. Each command also clearly defines a set of inputs (data and arguments, which may be null) and a set of outputs (which may simple or complex, e.g., a flag, 0 or 1, an argument, a value or set of values, a function, etc.).

In operation 804, the hardware processor transmits a first message to a software processor of (e.g., of the server device) requesting a location of the content data. This first message is sent in response to receiving the request to deliver the content data.

The software processor may be a CPU, GPU, integrated circuit, FPGA, ASIC, or some other processor that is configured to manage and/or control a content cache accessible to the server device.

In operation 806, the hardware processor receives a second message from the software processor indicating that the content data is stored in a content cache of the hardware processor. The second message may be transmitted by the software processor to the hardware processor using any communication channel available, such as a direct connection, a bus, wireless connection, etc. Some example communication channels include, but are not limited to, serial, serial peripheral interface (SPI), inter integrated circuit (I2C), improved inter integrated circuit (I3C), etc. This second message may include a location, address, or other information usable by the hardware processor to acquire, obtain, and/or retrieve the requested content data from the content cache, without needing to poll and/or search the content cache or an index thereof to find a storage location of the content data.

In operation 808, the hardware processor retrieves the content data from the content cache of the hardware processor in response to receiving the second message. In other words, the second message provides information (location, address, and/or identifier) for where the requested content data is stored, allowing the hardware processor to acquire the requested content data. The hardware processor may copy the content data to RAM or some other fast memory device local to the hardware processor, either in totality or in portions or chunks that are acquired by the hardware processor in conjunction with the content data being provided and/or delivered to the requesting device.

In operation 810, the hardware processor delivers the content data to the requesting device. Delivery may be achieved using any communication channel that connects the server device to the requesting device, such as a wired or wireless network, the Internet, a direct connection, a RF and/or Bluetooth™ connection, a NFC channel, etc. Moreover, the content data may be delivered to the requesting device as streamed content, delivering portions or packets of the requested content in series as the content is consumed on the requesting device.

According to one embodiment, the software processor may be configured to process the content data after retrieval from the content cache. Processing the content data may include, but is not limited to, compression/decompression operations, transcoding, tunnel processing, network transport protocol processing, encryption/decryption operations, etc. According to an embodiment, before, after, or during a period of time when the software processor is processing the content data, the software processor may use the content cache of the hardware processor as a buffer for storage of data in stages of processing. In this embodiment, after processing the content data and prior to delivering the content data in operation 810, at least a portion of the content data may be stored in the content cache of the hardware processor.

In one embodiment, the hardware processor may process the content data after release from TCP, with the processing after release from TCP including, but not being limited to, TLS, compression, encryption, storage read, etc.

In one embodiment, one or more packets that include the requested content may be encapsulated in at least one overlay packet by a tunnel device in the network prior to being delivered to the requesting device. A tunnel device may be a router, server, or some other network device capable of tunnel termination and initiation within the network. In one embodiment, the server device may comprise a tunnel device and/or functionality of a tunnel device for encapsulating and decapsulating packets and overlay packets. Each overlay packet includes an overlay header. Any suitable overlay and/or tunneling method and/or protocol may be used for the overlay packet(s), such as VXLAN, IPSec, GTP, etc.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more ASICs, FPGAs, or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, datacenter servers, networking devices or any other device that incorporates hard-wired and/or program logic to implement the techniques.

Figure 9:
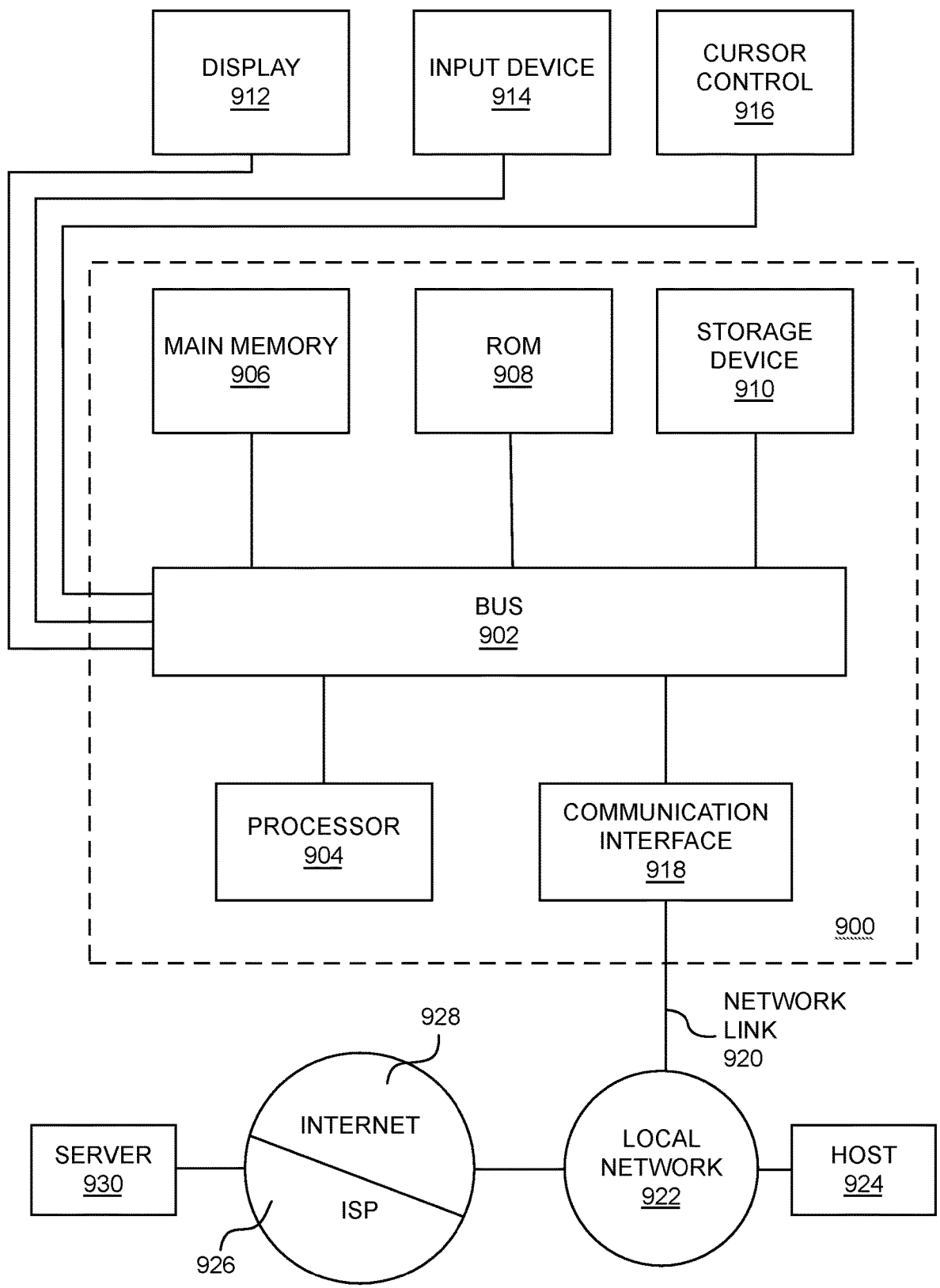
FIG. 9 shows a block diagram of an example computing system that may implement the features and processes of FIGS. 1-8.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or solid state disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or in addition, the computer system 900 may receive user input via a cursor control 916, such as a mouse, a trackball, a trackpad, a touchscreen, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. The display 912 may be configured to receive user input via one or more pressure-sensitive sensors, multi-touch sensors, and/or gesture sensors. Alternatively or in addition, the computer system 900 may receive user input via a microphone, video camera, and/or some other kind of user input device (not shown).

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a network, via a NIC, such as an Ethernet controller or Wi-Fi controller. A NIC local to computer system 900 can receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

What is claimed is:

1. A method, comprising:
receiving, by a server device from a requesting device, a request to deliver content data;
responsive to receiving the request to deliver the content data: determining a location of the content data; and
responsive to determining that the content data is stored in a content cache of a computing device associated with the server device: sending instructions to the computing device to provide the content data to the requesting device,
responsive to determining that the content data is not stored in the content cache of the computing device: instructing the computing device to store the content data in the content cache and provide the content data to the requesting device
wherein the method is performed by at least one processor of the server device.

2. The method as recited in claim 1,
wherein receiving the request to deliver the content data comprises receiving, by a network interface card (NIC) of the server device, the request to deliver the content data, the request indicating the requesting device;
wherein determining the location of the content data comprises:
sending, by the NIC, a first message to a processor of the server device identifying the content data; and
receiving, by the NIC, a second message from the processor responsive to sending the first message, the second message indicating that the content data is stored to the content cache of the NIC; and
wherein the NIC delivers the content data to the requesting device from the content cache of the NIC in response to receiving the instructions to provide the content data to the requesting device.

3. The method as recited in claim 1, further comprising, responsive to sending the instructions to the computing device to provide the content data:
retrieving the content data from the content cache of the computing device; and
delivering the content data to the requesting device.

4. The method of claim 1, further comprising,
prior to determining the location of the content data, determining whether to store the content data in the content cache of the computing device, and
responsive to determining to store the content data in the content cache, instructing the computing device to store the content data in the content cache of the computing device.

5. The method of claim 4, further comprising, prior to storing the content data in the content cache of the computing device, processing the content data by performing an action selected from a group comprising: compression operations, transcoding, tunnel processing, network transport protocol processing, and encryption operations.

6. The method of claim 4, further comprising, prior to providing the content data to the requesting device, processing the content data by performing an action selected from a group comprising: compression operations, transcoding, tunnel processing, network transport protocol processing, and encryption operations.

7. The method of claim 1, wherein the content cache is a component of the computing device and is physically located with the computing device.

8. The method of claim 1, wherein the content cache of the computing device is physically located remote from the server device.

9. The method of claim 1, wherein the computing device is a command-aware hardware processor configured to execute command bundles.

10. The method of claim 1, wherein the computing device is a network interface card (NIC) in electronic communication with the server device.

11. The method of claim 1, wherein the content cache of the computing device is configured to operate with any application protocol.

12. An apparatus, comprising a memory comprising programmed instructions stored thereon and one or more processors configured to be capable of executing the stored programmed instructions to:
receive, by a server device from a requesting device, a request to deliver content data;
responsive to receiving the request to deliver the content data: determine whether to store the content data in a content cache of a computing device associated with the server device; and
responsive to determining to store the content data in the content cache of the computing device: provide the content data to the computing device for storage in the content cache of the computing device, and
wherein the one or more processors are of the server device.

13. The apparatus of claim 12, wherein the computing device obtains the content data for storage in the content cache of the computing device from a storage location provided by the server device.

14. The apparatus of claim 13, wherein the computing device is a network interface card (NIC) in electronic communication with the server device, and wherein the server device sends the content data to the NIC for storage in the content cache of the NIC.

15. The apparatus of claim 13, wherein the processors are further configured to be capable of executing the stored programmed instructions to:
process the content data by performing an action selected from a group comprising:
compression operations, transcoding, tunnel processing, network transport protocol processing, and encryption operations; and
use the content cache of the computing device as a buffer during the processing of the content data.

16. The apparatus of claim 13, wherein the processors are further configured to be capable of executing the stored programmed instructions to:
determine that a triggering condition associated with the content data has occurred; and
responsive to occurrence of the triggering condition associated with the content data: evict the content data from the content cache of the computing device.

17. A system, comprising a server device comprising a software processor, a computing device comprising a hardware processor, the hardware processor being configured to perform first operations comprising:
- receiving, at the hardware processor, a request from a requesting device to deliver content data;
- responsive to the request to deliver the content data: transmitting, by the hardware processor, a first message to the software processor requesting a location of the content data;
- receiving, at the hardware processor, a second message from the software processor indicating that the content data is stored in a content cache of the hardware processor; and
- responsive to receiving the second message: retrieving, by the hardware processor, the content data from the content cache of the hardware processor; and delivering, by the hardware processor, the content data to the requesting device.

18. The system of claim 17,
- wherein the software processor is configured to perform second operations comprising processing the content data by performing an action selected from a group comprising: compression operations, transcoding, tunnel processing, network transport protocol processing, and encryption operations,
- wherein the content cache of the hardware processor is used as a buffer during the processing of the content data, and
- wherein the first operations further comprise, after processing and prior to delivering the content data, storing the content data in the content cache of the hardware processor.

19. A non-transitory computer readable medium having stored thereon instructions comprising executable code which when executed, causes performance of the following operations:
- performing, via a hardware processor of a computing device, first operations comprising:
  - receiving, at the hardware processor, a request from a requesting device to deliver content data;
  - responsive to the request to deliver the content data: transmitting, by the hardware processor, a first message to a software processor of a server device requesting a location of the content data;
  - receiving, at the hardware processor, a second message from the software processor indicating that the content data is stored in a content cache of the hardware processor; and
  - responsive to receiving the second message: retrieving, by the hardware processor, the content data from the content cache of the hardware processor; and delivering, by the hardware processor, the content data to the requesting device.

20. The non-transitory computer readable medium of claim 19, wherein the executable code further causes performance of the following operations:
- performing, via the software processor, second operations comprising processing the content data by performing an action selected from a group comprising: compression operations, transcoding, tunnel processing, network transport protocol processing, and encryption operations; and
- using the content cache of the hardware processor as a buffer during the processing of the content data,
- wherein the first operations further comprise, after processing and prior to delivering the content data, storing the content data in the content cache of the hardware processor.

* * * * *